United States Patent Office 2,709,691
Patented May 31, 1955

2,709,691

VINYL CHLORIDE POLYMERS PLASTICIZED WITH NONYL PHENYL, 2-ETHYL HEXYL SUCCINATES

Joachim Dazzi, Dayton, Ohio, assignor to Monsanto Chemical Company, St. Louis, Mo., a corporation of Delaware No Drawing. Original application September 21, 1954, Serial No. 228,540, now Patent No. 2,689,865, dated September 21, 1954. Divided and this application March 15, 1954, Serial No. 416,440

6 Claims. (Cl. 260—31.8)

The present invention relates to esters of succinic acid and more specifically provides the new nonylphenyl 2-ethylhexyl succinate and vinyl chloride polymers plasticized with the new succinate.

An object of the invention is the provision of new derivatives of succinic acid; a further object is the preparation of new and useful compounds; still another object of the invention is the provision of efficient plasticizers for vinyl chloride polymers. Other objects may be hereinafter disclosed.

These objects are accomplished by the following invention wherein there are prepared new mixed esters of succinic acid substantially according to the scheme:

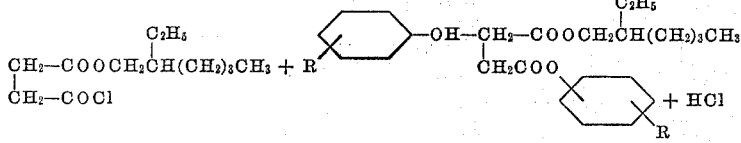 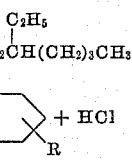

in which R is an alkyl radical of 9 carbon atoms.

Compounds provided by the present invention include 2-n-nonylphenyl 2-ethylhexyl succinate, 4-n-nonylphenyl 2-ethylhexyl succinate, 2-isononylphenyl 2-ethylhexyl succinate, 4-isononylphenyl 2-ethylhexyl succinate, 2-tert-nonylphenyl 2-ethylhexyl succinate, and 4-tert-nonylphenyl succinate. The nonylphenols used for the preparation of the present compounds are readily obtainable by alkylation of phenol with a mono-olefinic aliphatic hydrocarbon of 9 carbon atoms or with an alkyl halide of 9 carbon atoms. Particularly useful are nonylphenols obtained by alkylation of nonylphenol with the isononene which is obtained by polymerization of propylene. Reaction of the 2-ethylhexyl succinyl chloride with the nonylphenols to yield the present esters is effected readily by contacting the phenol with the ester advantageously in the presence of an esterifying catalyst at ordinary or increased temperatures until formation of the mixed esters has occurred. Esterifying catalysts which may be employed, are basic or acidic agents which are substantially inert during the reaction conditions, for example, inorganic or organic acids or acid reacting salts such as sulfuric acid, hydrochloric acid, acetic acid, calcium bisulfite, sodium or potassium hydroxide, sodium carbonate, pyridine, etc. The reaction may be effected in the presence or absence of an extraneous diluent. As diluents there may be used, e. g., inert liquids such as ether, acetone, dioxane, nitrobenzene, toluene, etc. Advantageously the reaction is effected under substantially anhydrous conditions in order to avoid hydrolysis of the acyl halide, and provisions are made for removing the hydrogen halide evolved as it is formed. In order to neutralize the evolved halide it is preferred to conduct the reaction in the presence of a basic catalyst.

Although temperatures up to the refluxing point of the reaction mixture may be employed, optimum yields are generally obtained by operating at around room temperature and preferably at a temperature of around 0° C.

Since the reaction proceeds by condensation of 1 mole of the phenol with 1 mole of the acyl halide, substantially equimolar proportions of the reactants are generally employed; however, an excess of either reactant may be employed since such an excess may be readily removed from the reaction product. The resulting succinate may be separated from any other constituents, e. g., diluent, catalyst, or unreacted material by distillation, extraction, etc.

The present nonylphenyl 2-ethylhexyl succinates are stable, rather high boiling materials which are advantageously employed in the chemical and allied industries for a wide variety of purposes. They are of general utility as plasticizers for synthetic resins and plastics and especially for vinyl chloride polymers to which polymers they confer a high degree of flexibility at even very low temperatures.

A wide variety of plasticizers has been employed for the purpose of improving the physical properties of vinyl chloride polymers. Particular attention has been given to the improvement of flexibility and heat and light stability for such plasticized compositions. In many instances the improvement in flexibility has been obtainable only by sacrificing other desirable properties of an ideal polyvinyl chloride composition. We have found that very good flexibility is imparted to vinyl chloride polymers when the present products are employed as plasticizers for such polymers.

The nonylphenyl 2-ethylhexyl succinates are valuable plasticizers for polyvinyl chloride and copolymers of at least 70 per cent by weight of vinyl chloride and up to 30 per cent by weight of an unsaturated monomer copolymerized therewith, for example, vinyl acetate, vinylidene chloride, etc. The present compounds impart great flexibility to vinyl chloride polymers at very low temperatures; they are compatible with such polymers, and show no exudation of plasticizer even at plasticizer content of up to 50 per cent.

Although the quantity of plasticizer will depend upon the particular polymer to be plasticized and upon its molecular weight, it is generally found that compositions having from 5 per cent to 50 per cent by weight of plasticizer will, in most cases, be satisfactory for general utility. The good flexibility of the plasticized composition increases with increasing plasticizer concentration.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Low temperature flexibility.*—Low temperature flexibility is one of the most important properties of elastomeric vinyl compositions. While many plasticizers will produce flexible compositions at room temperature the flexibility of these compositions at a low temperature may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of the plasticized composition's usefulness as an elastomer.

*Hardness.*—A standard instrument made by the Shore Instrument Company is used for this determination and expresses the hardness in units from 1 to 100. The hardness of a composition is judged by its resistance to the penetration of a standard needle applied to the composition under a standard load for a standard length of time.

*Volatility.*—Just as a decrease in low temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized compositions become stiff and hard. The test for plasticizer volatility herein employed is that described by the American Society for Testing Materials under the designation D-744-44T.

The invention is further illustrated, but not limited, by the following examples:

Example 1

Into a 500 ml. three necked flask equipped with a dropping funnel, mechanical stirrer, and a calcium chloride drying tube there was charged 44 g. (0.2 mole) of 4-isononylphenol (obtained by reaction of phenol with a polymeric $C_9$ olefin obtained by polymerization of propylene), 150 g. of ether and 30 g. of pyridine. The whole was then cooled to a temperature of 0° C. and to the cooled mixture there was then added, during 1.2 hours, 0.2 mole of 2-ethylhexyl succinyl chloride. The whole was then stirred for 40 minutes at a temperature of from 0° C. to 5° C. The reaction product was then washed with water and aqueous sodium hydroxide and the washed material was distilled to yield 4-nonylphenyl 2-ethylhexyl succinate B. P. 220–240° C./1–2 mm., $n_D^{25}$ 1.4813.

Example 2

Sixty parts of polyvinyl chloride and 40 parts by weight of the 4-isononylphenyl 2-ethylhexyl succinate of the above example were mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gave a value of minus 34° C., which value denotes extremely good low temperature properties. Tests on the volatility characteristics of the plasticized composition gave a value of 8.5 per cent. When subjected to heat at a temperature of 325° F. for a period of 30 minutes the clarity and color of the molded product were substantially unchanged. The plasticized material had a hardness of 81 before the volatility test and a hardness of 78 after the volatility test.

The very good results obtained by employing 4-isononylphenyl 2-ethylhexyl succinate as a plasticizer for polyvinyl chloride are surprising, for 4-nonylphenyl esters of succinic acid, generally, cannot be employed as plasticizers for polyvinyl chloride. Thus, 4-isononylphenyl (butoxyethoxy)ethyl succinate, which ester has the same number of carbon atoms as do the nonylphenyl 2-ethylhexyl succinates, is incompatible with polyvinyl chloride and cannot be used with this polymer to yield homogenous compositions containing 40 parts ester and 60 parts polyvinyl chloride.

While the above example shows a composition in which the ratio of plasticizer to polymer content is 40:60, the content of ester to polyvinyl chloride may be widely varied, depending upon the properties desired in the final product. For many purposes a plasticizer content of, say, from only 10 per cent to 20 per cent is preferred. The present esters are compatible with polyvinyl chloride over wide ranges of concentrations, up to 50 per cent of esters based on the total weight of the plasticized composition yielding desirable products.

Although the invention has been described particularly with reference to the use of the present esters as plasticizers for polyvinyl chloride, these esters are advantageously employed also as plasticizers for copolymers of vinyl chloride, for example, the copolymers of vinyl chloride with vinyl acetate, or vinylidene chloride, etc. Preferably, such copolymers have a high vinyl chloride content, i. e., a vinyl chloride content of at least 70 per cent by weight of vinyl chloride and up to 30 per cent by weight of the copolymerizable monomer.

The plasticized polyvinyl halide compositions of the present invention have good thermal stability; however, for many purposes it may be advantageous to use known stabilizers in the plasticized compositions. Inasmuch as the present esters are substantially unreactive with the commercially available heat and light stabilizers which are commonly employed with polyvinyl chloride or copolymers thereof, the presence of such materials in the plasticized products does not impair the valuable properties of the present esters. The present esters are of general utility in softening vinyl chloride polymers. They may be used as the only plasticizing component in a compounded vinyl chloride polymer or they may be used in conjunction with other plasticizers.

This application is a division of my copending application Serial No. 228,540, filed May 26, 1951, now Patent Number 2,689,865.

I claim:

1. A resinous composition comprising a vinyl chloride polymer plasticized with an ester having the general formula

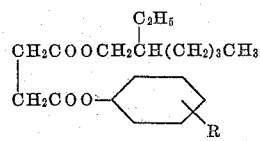

in which R is an alkyl radical of 9 carbon atoms.

2. A resinous composition comprising polyvinyl chloride plasticized with an ester having the general formula

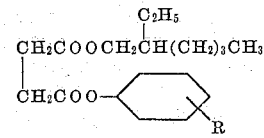

in which R is an alkyl radical of 9 carbon atoms.

3. A resinous composition comprising polyvinyl chloride plasticized with an ester having the general formula

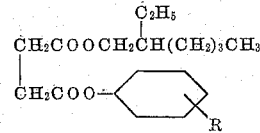

in which R is an alkyl radical of 9 carbon atoms, said ester being from 5 to 50 per cent by weight of the composition.

4. A resinous composition comprising a copolymer of up to 70 per cent by weight of vinyl chloride and up to 30 per cent by weight of an unsaturated monomer copolymerizable therewith, said copolymer being plasticized with an ester having the general formula

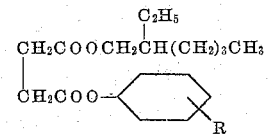

in which R is an alkyl radical of 9 carbon atoms.

5. A resinous composition comprising a copolymer of up to 70 per cent by weight of vinyl chloride and up to 30 per cent by weight of an unsaturated monomer copolymerizable therewith, said copolymer being plasticized with an ester having the general formula

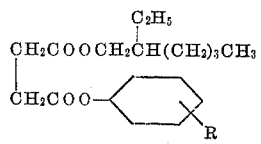

in which R is an alkyl radical of 9 carbon atoms, said ester being from 5 to 50 per cent by weight of the composition.

6. A resinous composition comprising polyvinyl chloride plasticized with 4-nonylphenyl 2-ethylhexyl succinate.

No references cited.